INVENTORS
Karl C. Speh
Walter E. Landauer
BY
ATTORNEYS

May 16, 1961  K. C. SPEH ET AL  2,984,746
MEASURING APPARATUS

Filed Jan. 30, 1958  2 Sheets-Sheet 2

INVENTORS
Karl C. Speh
Walter E. Landauer
BY
ATTORNEYS

United States Patent Office 2,984,746
Patented May 16, 1961

2,984,746

MEASURING APPARATUS

Karl C. Speh, Hempstead, and Walter E. Landauer, Forest Hills, N.Y., assignors to Cutler-Hammer, Inc., Milwaukee, Wis., a corporation of Delaware Filed Jan. 30, 1958, Ser. No. 712,117

15 Claims. (Cl. 250—83.3)

This invention relates to a self-checking radiation monitor.

Radiation monitors are widely used at the present time to obtain a continuous indication of radioactivity, and to give an alarm when the radioactivity exceeds a given level. Commonly a given monitor will be designed for a particular type of radioactivity, for example, to detect gamma rays, or neutrons, or beta particles, etc.

Reliability is very important in an alarm system. However, even when care has been taken in the design of the equipment and the selection of components, occasionally a failure will occur. While periodic maintenance checks of the equipment may be made, practical inspection intervals are often so long, and the consequences of a failure between inspections so disastrous, that this procedure is unsatisfactory in many cases.

It is an object of the present invention to provide a self-checking radiation monitor which automatically checks the operation at frequent intervals to make sure that the equipment is functioning properly. The time required for each check may be made very short, and the frequency of the checks may be selected to meet the requirements of a particular application. The checks can readily be made much more frequently than is ordinarily feasible for personal maintenance, and human failure is avoided.

In checking a monitor, it is highly desirable to check every portion of the equipment which contributes to the output. In an acoustic alarm type monitor this would include setting off the siren, etc. However, frequent alarms are commonly undesirable. Thus a check at short intervals which tests all portions of the system except for the actual alarm is adequate for most purposes, and a maintenance check of the alarm itself may be made at longer intervals to insure that that portion of the system is in operating condition.

Radiation monitors are often designed to operate over a considerable range of intensities, for example, three or more decades. In checking the system, it is desirable to make sure that the system is functioning satisfactorily over the entire range of intensities, and it is especially important to insure operation at high intensities where the greatest danger arises.

In accordance with the present invention, the radiation detector is exposed periodically to a local source of radioactivity, and means are provided to determine whether the monitor is functioning properly. An adjustment is provided for setting the alarm level over a desired range, and the checking level is advantageously selected above the maximum alarm setting in this range. Advantageously, the count-rate circuit includes several stages operating over different counting ranges in such manner that the outputs of all stages are required for the maximum count rate, whereas a lesser number participate in counting lower rates. Then, by selecting the checking level to lie within the range for which the outputs of all stages are required, failure of any one of the stages will result in an output less than the checking level, and an indication of faulty operation in any portion of the response range is obtained.

When detecting certain types of radioactivity such as gamma rays and thermal neutrons, it is often undesirable to employ checking sources which emit corresponding gamma rays or thermal neutrons. Rather, it is desirable to employ checking sources which are less dangerous, or more readily shieldable, etc. In accordance with a feature of the present invention, special provision is made enabling the use of a beta source to check a gamma detector and an alpha source to check a thermal neutron detector.

These and other features of the invention will be more readily understood from the following description of a specific embodiment thereof.

Figure 1:
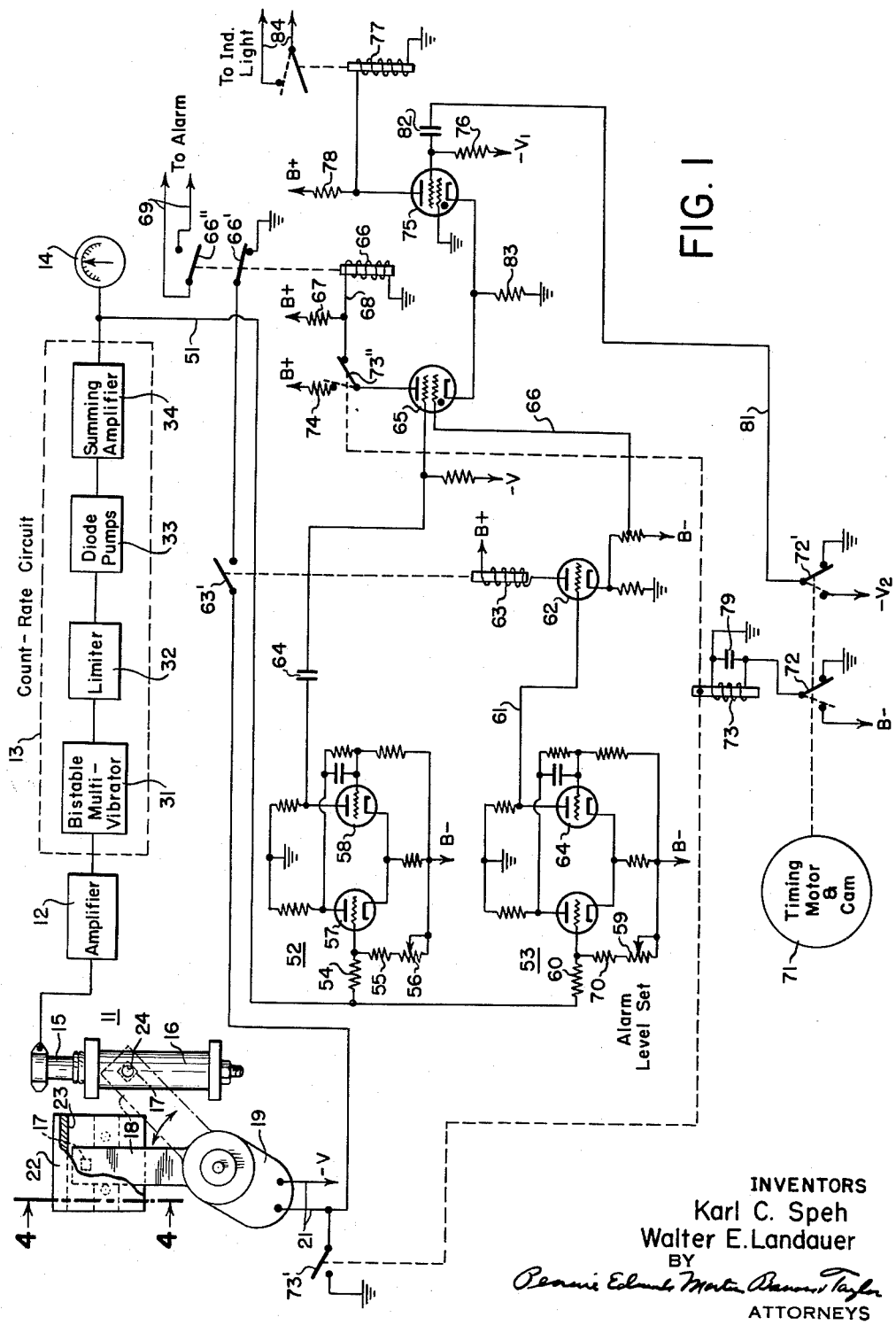
Fig. 1 is a circuit diagram of a self-checking radiation monitor in accordance with the invention.

Referring to Fig. 1, a radioactivity detector 11 is connected to an amplifier 12 whose output is supplied to a count-rate circuit generally indicated by box 13. A meter 14 is connected to the output of the count-rate circuit to give a continuous indication of the intensity of the radiation incident on detector 11.

Detector 11 may be selected to be sensitive to the particular form or forms of radioactivity which it is desired to monitor. In Fig. 1 the detector is designed to be sensitive primarily to gamma rays. To this end a detector tube 15 of the Geiger-Müller type, advantageously halogen-quenched, is employed. Such a detector tube commonly gives greater count-rate outputs at some energy levels than at others. Thus, a metal shield 16 is placed around the tube designed to sufficiently equalize the response over the desired range of operation.

Check means is provided which is actuable to expose the detector to a local check source of radioactive material. As here shown, a pellet of radioactive material 17 is mounted on the arm 18 of a suitable device 19 for moving the check source from the shielded position shown in full lines to the check position shown in dotted lines, and vice versa. Device 19 may be selected as desired, and is here shown as a rotary solenoid which is spring-biased to the shielded position, and adapted upon supplying power to the input terminals 21, to move the arm 18 to checking position.

Figure 4:
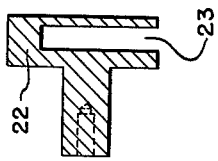
Fig. 4 is a detail of the local source shield used in Fig. 1.

Shield 22 has a slot 23 therein, as shown in Fig. 4, accommodating the end of arm 18 and the source 17 in the shielded position. The material of the shield is selected to shield adequately the particular radioactive material employed. In this specific embodiment, a source of beta particles such as Sr90–Y90 is employed, and the shield 22 is brass.

The shield 16 surrounding the sensitive portion of the detector tube 15 is substantially impervious to beta particles. In order to enable checking with a beta source, the shield 16 is provided with an aperture 24 and the local check source 17 is moved over the aperture when in checking position. In housing the detector a shield of suitable material may be placed over aperture 24 in order to substantially prevent gamma rays from entering the aperture, but sufficiently spaced therefrom to allow arm 18 to pass therebetween. Since in many applications the gamma rays to be detected will come from a known direction, the additional shield may readily be positioned if desired, to lie in the path of the gamma rays to the aperture. In many cases this additional shielding may be unnecessary, since the area of aperture 24 may be made very small compared to the total sensitive area of the detector tube 15.

The amplifier 12 and count-rate circuit 13 may follow conventional design. As here shown, the count-rate circuit includes a bistable multivibrator 31 which is triggered from one stable condition to the other by pulses from amplifier 12. Thus, the output of the multivibrator 31 is a rectangular waveform of half the frequency of the incoming pulses. This output is supplied to a limiter 32. The output of the limiter is supplied to a plurality of diode pump circuits 33 and then through a summing amplifier 34 to meter 14.

The meter calibration will be correct only if the input voltage to the diode pump circuits is of constant amplitude. Although multivibrator 31 might, with careful design, yield output waves of sufficiently constant amplitude, an additional limiter 32 is here employed. This may take the form of a cathode-coupled bistable multivibrator, or other desired form known in the art.

The diode pump circuits transform the input rectangular waves into a direct voltage closely proportional to the logarithm of the pulse rate.

Figure 2:
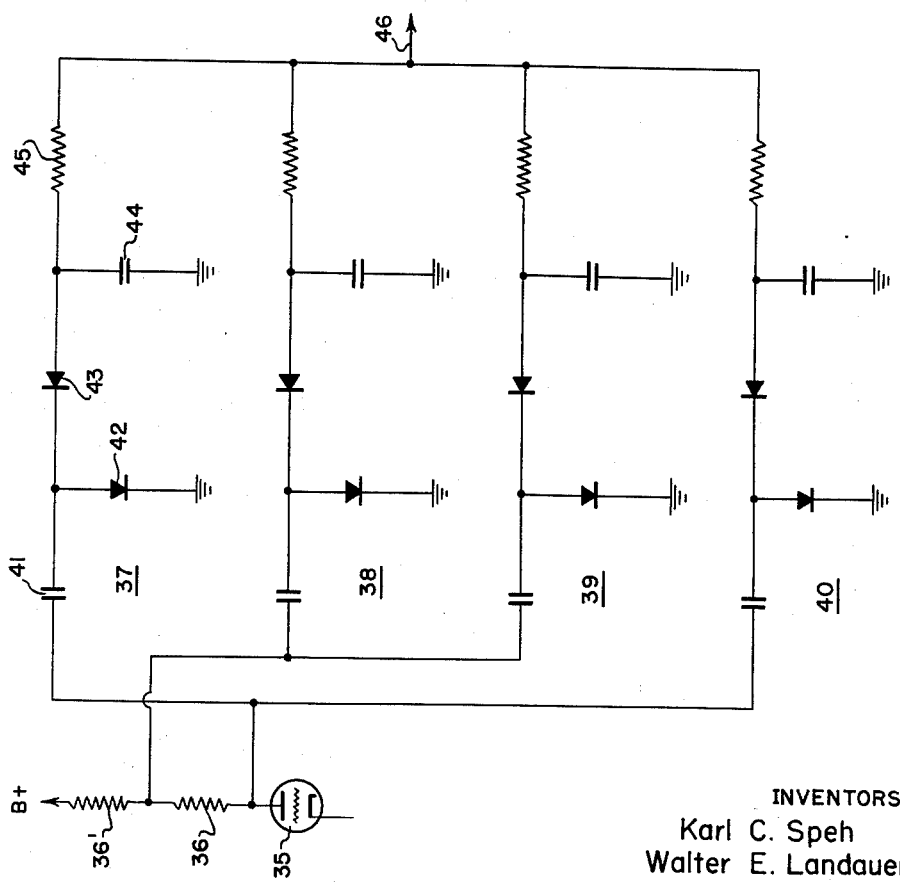
Fig. 2 is a schematic of suitable diode pump circuits usable in the count-rate circuit.

Referring to Fig. 2, the output stage of limiter 32 is here shown as a triode 35 and contains two plate output resistors 36 and 36' in series to B+. The output voltage across both resistors is supplied to counting stages 37 and 40, whereas the output voltage across only resistor 36' is supplied to the other two counting stages 38, 39.

Each counting stage is arranged to count over approximately a one-decade range of pulse frequencies, and successive stages are designed to count over successively higher decades. Considering stage 37, the rectangular output waves from tube 35 are supplied through capacitor 41 to oppositely-poled diodes 42 and 43. A shunt capacitor 44 is connected to the output end of diode 43 and a series resistor 45 is connected to the output line 46, which is connected to a feedback summing amplifier 34. When a rectangular wave from tube 35 is applied to stage 37, capacitor 41 is alternately charged through the diode 42 and discharged through the diode 43 into the tank capacitor 44. The resultant voltage across capacitor 44 produces current in resistor 45 and the input circuit of the following summing amplifier. By proper selection of the values of capacitors 41, 44 and resistor 45, in conjunction with the input circuit of the feedback amplifier, a count rate response of a decade can readily be obtained.

Assuming that stage 37 is designed for the lowest decade in the range of intensities for which the apparatus is designed, stage 38 will be designed for the next decade, stage 39 for the third decade and stage 40 for the fourth decade. The individual outputs of the stages are combined additively in line 46 and the input circuit of the summing amplifier. The resultant output will be substantially logarithmic with the count rate. The response at very low and very high count rates may not correspond as closely to the logarithmic relationship as the remainder of the range. Hence, in a specific embodiment where it was desired to count accurately over a three-decade range, four decade stages were employed and the extremes in the overall characteristic were not used.

The design of diode pump circuits such as shown in Fig. 2 is well known. See, for example, the articles by Cooke-Yarborough and Pulsford in the Proceedings of the Institution of Electrical Engineers, London, April 1951 pages 191–203. The number of individual stages may be changed for applications requiring a more limited or more extensive overall range. In many cases all stages may be fed with the same input rectangular wave, but slightly different amplitude input waves for the various stages sometimes increases overall accuracy. This is shown in Fig. 2.

As will be evident, the output of the summing amplifier 34 in Fig. 1 will be a D.-C. voltage varying in amplitude with the count rate. This output is fed through line 51 to the inputs of a fixed check level detector and an adjustable alarm level detector generally designated as 52 and 53, respectively. In the specific embodiment shown, the level detectors are Schmitt trigger circuits which may be identical except for their input circuits. The input circuit of the check level detector 52 comprises a series resistor 54 and a pair of shunt resistors 55 and 56, serving as a voltage divider in the input grid of tube 57. Resistor 56 is shown adjustable but in the specific embodiment shown it is an internal adjustment employed for initial calibration.

Schmitt trigger circuits are well known and need not be described in detail. When the input signal at the grid of tube 57 is below a predetermined level, tube 58 is "on," that is, it is in a highly conductive condition. When the signal at the input of tube 57 exceeds a predetermined level, conduction in tube 58 is cut off and tube 57 becomes conductive. This action takes place very rapidly. When the input signal to tube 57 goes below the predetermined level, the circuit returns to its initial condition with tube 58 on.

The alarm level detector 53 is similar to 52, except that the constants of the resistors 60, 70 and 59 are advantageously selected so that the alarm detector 53 triggers at a level below that of 52 for any setting of the Alarm Level Set resistor 59. That is, the voltage division in the input circuit of level detector 53 is advantageously greater for any setting of resistor 59 than the voltage division in the input circuit of level detector 52, once the initial adjustment of resistor 56 has been made.

In addition, the input circuit of the check level detector 52 is advantageously initially adjusted so that it triggers only when the count rate lies within the range of the highest decade stage in the range over which the alarm level may be set. If the alarm level set range includes the last decade in the diode pump circuits, then the check level is advantageously set in the range of the last decade stage.

As will be explained, the check level detector 52 is triggered by placing the local check source 17 over the aperture 24 of detector 11 during the checking period. The local source is sufficiently intense so that the corresponding count rate during checking equals or exceeds the selected check level.

From the above discussion of Fig. 2, it will be understood that when stage 37 reaches the top of its range, it thereafter contributes a substantially fixed output component to the total current representing a higher count rate. Thus, with the several stages 37–40 designed to give equal outputs at the tops of their respective ranges, for the maximum count rate each stage will contribute one-fourth to the total output. By setting the checking level in the range of the last decade stage, failure of any one of the decade stages will prevent the development of an output corresponding to the checking level. Consequently, if an indication is obtained corresponding to the high checking level, one can be assured that all of the diode pump stages are functioning. Therefore, functioning over the entire range of intensities for which the instrument is designed is checked. This is of considerable importance since the range over which the alarm level may be set may extend over several decades of intensity, and it is important to insure that all the necessary stages are functioning properly regardless of where the alarm level is set in its predetermined range.

The output of the alarm level detector 53 is supplied through line 61 to an amplifier stage including tube 62 having a relay coil 63 in the plate circuit thereof. When the alarm level is exceeded, tube 64 in the level detector changes from conducting to non-conducting condition, thereby raising the voltage in line 61 and causing tube 62 to pass current. The voltage in the cathode circuit of tube 62 thereupon goes more positive, and this voltage is supplied through line 66 to the control grid of a screen-grid gas discharge tube 65 of the Thyratron type.

At the same time, the current in tube 62 actuates relay 63 and closes the relay switch 63'. This completes an energizing circuit for check source actuator 19, thereby moving the radioactive check source 17 in front of aperture 24. This produces a high count rate exceeding the check level, and the check level detector 52 is triggered to turn off current in tube 58. This delivers a positive-going pulse through capacitor 64 to the screen grid of the gas discharge tube 65.

The gas discharge tube 65 controls the alarm and is itself jointly controlled by the responses obtained from the alarm level detector and the check level detector through line 66 and capacitor 64, respectively. Normally tube 65 is non-conducting and the biases produced on the control and screen grids from sources B— and —V are selected so that signals in the positive direction on both grids are required to fire the tube. When the potential in line 66 goes more positive and a positive pulse is delivered through capacitor 64, as just explained, tube 65 fires. That is, it changes from non-conducting to a highly conducting condition.

Alarm relay 66 is normally energized from a suitable source of power denoted B+, through resistor 67. Thus, the switch arms 66' and 66" are in the positions shown. Resistor 67 also serves as the load for tube 65 in the position shown for switch arm 73". Therefore, when tube 65 fires the potential in line 68 drops, releasing relay 66. Relay arm 66" thereupon moves to its upper position and closes a circuit between lines 69 leading to the alarm bell or siren, etc. If desired, the alarm circuit can be arranged so that relay arm 66" normally closes the circuit between lines 69 and provision made to set off the alarm when the circuit 69 is opened.

As has been described, in the specific embodiment shown the setting off of the alarm involves bringing the check source 17 into check position. Meter 14 will then indicate a high count rate corresponding to the check source, and will no longer indicate the intensity of the radiation which set off the alarm. Accordingly, when relay 66 is deenergized, relay arm 66' breaks the ground connection to the energizing circuit for source actuator 19, thereby allowing the check source to return to its shielded position. This allows meter 14 to indicate the incident radiation which set off the alarm. The removal of source 17 does not cut off the alarm since tube 65, once fired, cannot be cut off until the plate voltage thereto is removed. Suitable provision may be made for manually cutting off current in tube 65 to reset the equipment after an alarm has been given.

Considering now the checking operation, a timing motor and cam 71 is provided which periodically moves switch arms 72, 72' to the dotted positions. For example, in one specific embodiment the timing motor is arranged to initiate the checking period every ten minutes, and the checking period lasts for approximately eleven seconds. The frequency of checking can readily be changed to meet the requirements of a particular application and, if necessary, shorter checking periods can be employed.

When switch arm 72 is moved to its dotted position, relay 73 is energized from a suitable power source, here denoted B—, and the relay closes switch arm 73' to energize source actuator 19. This moves the check source 17 to its checking position, resulting in a high count-rate level at level detectors 52 and 53. Both level detectors will trigger if the apparatus is functioning properly, thereupon firing the alarm control tube 65, as above described.

In order to prevent setting off the actual alarm during the checking interval, switch arm 73" is moved by relay 73 to its dotted position. This is preferably a break-before-make switch so that tube 65 is disconnected from line 68 before the plate circuit thereof is reestablished through resistor 74 to B+. Accordingly, the firing of alarm control tube 65 during checking does not set off the actual alarm.

To indicate whether or not the circuits are functioning properly, a checking tube 75 of the gas discharge type is employed. The control grid of tube 75 is grounded and a negative voltage from a source denoted —$V_1$ is supplied through resistor 76 to the screen grid thereof. Thus, checking tube 75 is normally unfired. A relay 77 is connected in the plate circuit of tube 75 and is normally energized from B+ through the plate resistor 78 of the tube.

The timing switch arm 72', in its actuated (dotted) position, connects a negative power source —$V_2$ to the right hand side of capacitor 82, thus charging the capacitor to the difference between —$V_2$ and —$V_1$. Power source $V_2$ is more negative so that the right side of capacitor 82 is more negative than the left side.

Checking tube 75 is employed to determine whether or not the alarm control tube 65 has fired under check conditions. After a suitable interval to allow the circuits to function in response to the check source and fire tube 65, say 10 seconds, the timing motor 71 releases switch arms 72, 72' and allows them to return to their initial positions, as shown. Check relay 73 does not immediately return to its original condition, due to the presence of capacitor 79 thereacross. Thus, the checking conditions already described are maintained for a brief interval.

In the meantime, when switch arm 72' breaks the circuit to the power source —$V_2$, and grounds the right side of capacitor 82, the potential across the capacitor momentarily makes the screen grid potential of tube 75 positive to ground. Resistor 83 is common to the cathode circuits of both tubes 65 and 75. If tube 65 is fired, as it should be for proper circuit functioning, a positive voltage is developed at its cathode and the same positive voltage exists at the cathode of tube 75. The magnitude of the momentary positive potential on the screen grid is selected so that under these conditions tube 75 will not fire. This magnitude can be controlled by properly selecting the difference between —$V_1$ and —$V_2$.

If the monitoring circuits are not functioning properly, alarm control tube 65 will not fire, and accordingly the cathode of check tube 75 will be at ground potential when the screen grid is driven momentarily positive. Consequently, tube 75 will fire, deenergizing relay 77 and closing a circuit including lines 84. Lines 84 may be connected to energize an indicating light, or give some other indication of faulty operation.

After a brief interval determined by the time constant of relay coil 73 and the shunt capacitor 79, relay 73 drops out and the circuit returns to its initial condition in which (if no failure has occurred) it responds to incident radiation and sets off an alarm when the radiation exceeds the set level. As relay switch 73" returns to the position shown, it momentarily removes plate voltage from tube 65, thereby returning the tube to its unfired condition. If check tube 75 has been fired, it remains fired to give a continuing indication of faulty operation. Manual reset means can of course be provided.

It will be apparent that the checking arrangement of the invention checks all portions of the circuit involved in producing an alarm, except for the alarm relay 66 and the alarm itself. These are normally highly reliable so that manual checking at suitable maintenance intervals ordinarily suffices and is preferable to setting off an actual alarm at frequent intervals. Further, a considerable portion of the checking arrangement itself is checked. For example, the means for exposing the detector to the local source of radioactivity and the check level detector 52 must function properly in order to avoid indicating faulty operation.

A few components of the checking circuit are not self-checking, such as the timing motor and associated switches, a defective check tube 75 and improper operation of the fault indicating relay 77. These may be checked during periodic maintenance. Since they represent only a small portion of the complete monitor, the likelihood of failure is proportionately small. Furthermore, the probability of failure of this small portion of the checking circuit during an interval when excessive radioactivity should set off an alarm is small.

In the specific embodiment of Fig. 1, gamma rays are detected. Other types of radioactivity may be detected with suitable change in the detector itself where required. For example, thermal neutrons may be monitored by employing a suitable detector, such as a boron-trifluoride proportional counter. Such a counter usually has a housing of metal, such as stainless steel. The thermal neutrons penetrate the stainless steel case and produce a count. It has been found that such a counter can be checked by a local source of alpha particles such, for example, as 25-year radium D. The alpha particles will not penetrate the stainless steel case and accordingly special provision must be made if such a checking source is to be employed.

Figure 3:
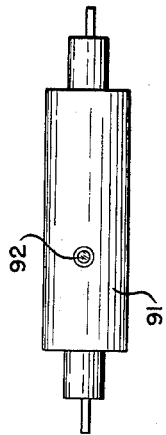
Fig. 3 shows a thermal neutron counter with special provision enabling checking with alpha particles.

Fig. 3 shows a proportional counter of this type having a stainless steel casing 91 in which a hole 92 has been drilled and covered with a mica window. In normal operation with thermal neutrons, the neutrons interact with the boron-trifluoride in the counter to give alpha particles which produce ionization. Thus, by admitting alpha particles through the mica window and aperture 92, direct ionization is produced and the operability of the counter is checked.

In the foregoing a preferred embodiment of the invention has been described. Many modifications are possible within the spirit and scope of the invention. For example, while it is preferred to check the operation of all portions of the alarm circuit through the final alarm control device, here shown as the gas discharge tube 65, it is possible to arrange the checking to indicate the proper functioning of the channel through the count-rate circuit, without checking the final stages. It is also possible to arrange the circuit so that the check source is not required for the development of an alarm signal. This can be done, for example, by arranging the alarm control tube 65 to be triggered by the alarm level detector 53 alone, and removing the connection from the check level detector 52, with appropriate change in bias on the screen grid of tube 65. Responses from the alarm level and check level detecors can then be checked separately. The arrangement shown is preferred, since considerable portions of the checking circuits are themselves checked.

It will be understood that the checking arrangement shown checks the presence of a response from the check level detector 52, as well as malfunctioning of the alarm control tube 65. If desired, the presence or absence of the check level response could be determined without checking the alarm control tube.

Many of the circuits specifically described may be changed to meet the requirements of a particular application. Also, if desired, the amplifier stage including tube 62 could be eliminated by appropriate design of the alarm level detector 53 to incorporate relay 63 in the plate circuit of tube 64 and provide for obtaining a suitable output signal for the alarm control tube 65.

Gas discharge tubes are employed for the alarm control tube and the checking tube, and have been found satisfactory. However, vacuum tubes or other devices may be employed if desired, with appropriate circuit changes if required. With gas discharge tubes it is usually more convenient to switch them from non-conductive to conductive conditions to set off an alarm or the fault indicating light, etc. With vacuum tubes or other devices it may be equally convenient to switch from conducting to non-conducting conditions, and either direction of operation may be employed as desired.

Checking sources of radioactive material other than those specifically mentioned may be employed as meets the requirements of a particular application. As described, by providing apertures in the shields local sources may be employed which give a different type of radioactivity from that intended to be detected. In some cases this is unnecessary as, for example, in an air particle detector designed to detect beta particles, where a beta source is conveniently employable.

We claim:

1. A self-checking radioactivity monitor which comprises a radioactivity detector and a count-rate circuit therefor, an alarm level detector connected to said count-rate circuit and adapted to yield a first response when the count rate exceeds a set alarm level, said alarm level being adjustable over a predetermined range, an alarm control circuit supplied with said first response, a check level detector connected to said count-rate circuit and adapted to yield a second response when the count rate exceeds a predetermined level at least as high as the maximum alarm level in said predetermined range, check means actuable to expose said detector to a check source of radioactive material and produce a count rate of at least said predetermined level, timing means for periodically actuating said check means for corresponding checking periods, and means for indicating the absence of said second response during said checking periods.

2. A self-checking radioactivity monitor which comprises a radioactivity detector and a count-rate circuit therefor, said count-rate circuit including a plurality of stages respectively responsive to successively higher count-rate ranges, the outputs of said stages being combined to give a resultant output in which the outputs of lower range stages contribute to the resultant output for count rates in higher ranges, an alarm level detector connected to said count-rate circuit and adapted to yield a first response when the count rate exceeds a set alarm level, said alarm level being adjustable over a predetermined range, an alarm control circuit supplied with said first response, a check level detector connected to said count-rate circuit and adapted to yield a second response when the count rate exceeds a predetermined level, said predetermined level being at least as high as to fall within the range of the highest count-rate stage in said predetermined alarm level range, check means actuable to expose said detector to a check source of radioactive material and produce a count-rate of at least said predetermined level, timing means for periodically actuating said check means for corresponding checking periods, and means for indicating the absence of said second response during said checking periods.

3. A self-checking radioactivity monitor which comprises a radioactivity detector and a count-rate circuit therefor, said count-rate circuit including a plurality of stages respectively responsive to successively higher count-rate ranges, the outputs of said stages being combined to give a resultant output in which the outputs of lower range stages contribute to the resultant output for count rates in higher ranges, an alarm level detector connected to said count-rate circuit and adapted to yield a first response when the count rate exceeds a set alarm level, said alarm level being adjustable over a predetermined range, an alarm control circuit supplied with said first response, a check level detector connected to said count rate circuit and adapted to yield a second response when the count-rate exceeds a predetermined level above said alarm level range, check means actuable to expose said detector to a check source of radioactive material and produce a count rate of at least said predetermined level, timing means for periodically actuating said check means for corresponding checking periods, and means for indicating the absence of said second response during said checking periods.

4. A self-checking radioactivity monitor which comprises a radioactivity detector and a count-rate circuit therefor, said count-rate circuit including a plurality of stages respectively responsive to successively higher approximately decade ranges of count rates, the outputs of said stages being approximately equal at the tops of their respective ranges and being combined additively to give a resultant output, an alarm level detector connected to said count-rate circuit and adapted to yield a first response when said resultant output exceeds a set alarm level, said alarm level being adjustable over a predetermined range, an alarm control circuit supplied with said first response, a check level detector connected to said count-rate circuit and adapted to yield a second response when said resultant output exceeds a predetermined checking level, said checking level being at least as high as to fall within the range of the highest decade stage in said predetermined alarm level range, check means actuable to expose said detector to a check source of radioactive material and produce a count rate of at least said predetermined level, timing means for periodically actuating said check means for corresponding checking periods, and means for indicating the absence of said second response during said checking periods.

5. A self-checking radioactivity monitor which comprises a radioactivity detector and a count-rate circuit therefor, an alarm level detector connected to said count-rate circuit and adapted to yield a first response when the count-rate exceeds a set alarm level, a check level detector connected to said count-rate circuit and adapted to yield a second response when the count rate exceeds a predetermined level at least as high as said alarm level, an alarm control device supplied with said first and second responses and jointly controlled thereby, check means actuable to expose said detector to a check source of radioactive material and produce a count rate of at least said predetermined level, means responsive to said first response for actuating said check means, whereby said second response is produced and the alarm control device actuated, timing means for periodically actuating said check means for corresponding checking periods, and means for indicating the absence of said second response during said checking periods.

6. A self-checking radioactivity monitor which comprises a radioactivity detector and a count-rate circuit therefor, an alarm level detector connected to said count-rate circuit and adapted to yield a first response when the count rate exceeds a set alarm level, a check level detector connected to said count-rate circuit and adapted to yield a second response when the count rate exceeds a predetermined level at least as high as said alarm level, an alarm control device supplied with said first and second responses and jointly controlled thereby, an output circuit from said control device for actuating an alarm, check means actuable to expose said detector to a check source of radioactive material and produce a count rate of at least said predetermined level, means responsive to said first response for actuating said check means, whereby said second response is produced and the alarm control device actuated, timing means for periodically actuating said check means for corresponding checking periods and rendering ineffective the output circuit to said alarm, and means for indicating non-actuation of said alarm control device during said checking periods.

7. A self-checking radioactivity monitor which comprises a radioactivity detector and a count-rate circuit therefor, an alarm level detector connected to said count-rate circuit and adapted to yield a first response when the count rate exceeds a set alarm level, said alarm level being adjustable over a predetermined range, a check level detector connected to said count-rate circuit and adapted to yield a second response when the count rate exceeds a predetermined level above said alarm level range, an alarm control device supplied with said first and second responses and jointly controlled thereby, an output circuit from said control device for actuating an alarm, check means actuable to expose said detector to a check source of radioactive material and produce a count rate of at least said predetermined level, means responsive to said first response for actuating said check means, whereby said second response is produced and the alarm control device actuated, timing means for periodically actuating said check means for corresponding checking periods and rendering ineffective the output circuit to said alarm, and means for indicating non-actuation of said alarm control device during said checking periods.

8. A self-checking radioactivity monitor which comprises a radioactivity detector and a count-rate circuit therefor, said count-rate circuit including a plurality of stages respectively responsive to successively higher count-rate ranges, the outputs of said stages being combined to give a resultant output in which the outputs of lower range stages contribute to the resultant output for count rates in higher ranges, an alarm level detector connected to said count-rate circuit and adapted to yield a first response when the count rate exceeds a set alarm level, said alarm level being adjustable over a predetermined range, a check level detector connected to said count-rate circuit and adapted to yield a second response when the count rate exceeds a predetermined level above said alarm level range, an alarm control device supplied with said first and second responses and jointly controlled thereby, an output circuit from said control device for actuating an alarm, check means actuable to expose said detector to a check source of radioactive material and produce a count rate of at least said predetermined level, means responsive to said first response for actuating said check means, whereby said second response is produced and the alarm control device actuated, timing means for periodically actuating said check means for corresponding checking periods and rendering ineffective the output circuit to said alarm, and means for indicating non-actuation of said alarm control device during said checking periods.

9. A self-checking radioactivity monitor which comprises a radioactivity detector and a count-rate circuit therefor, said count-rate circuit including a plurality of stages respectively responsive to successively higher approximately decade ranges of count rates, the outputs of said stages being approximately equal at the tops of their respective ranges and being combined additively to give a resultant output, an alarm level detector connected to said count-rate circuit and adapted to yield a first response when said resultant output exceeds a set alarm level, said alarm level being adjustable over a predetermined range, a check level detector connected to said count-rate circuit and adapted to yield a second response when said resultant output exceeds a predetermined checking level, said checking level being at least as high as to fall within the range of the highest decade stage in said predetermined alarm level range, an alarm control device supplied with said first and second responses and jointly controlled thereby, an output circuit from said control device for actuating an alarm, check means actuable to expose said detector to a check source of radioactive material and produce a count rate of at least said predetermined level, means responsive to said first response for actuating said check means, whereby said second response is produced and the alarm control device actuated, timing means for periodically actuating said check means for corresponding checking periods and rendering ineffective the output circuit to said alarm, and means for indicating non-actuation of said alarm control device during said checking periods.

10. A self-checking radioactivity monitor which comprises a radioactivity detector and a count-rate circuit therefor, an alarm level detector connected to said count-rate circuit and adapted to yield a first response when the count rate exceeds a set alarm level, a check level detector connected to said count-rate circuit and adapted to yield a second response when the count rate exceeds a predetermined level at least as high as said alarm level, an alarm control tube having a pair of input control circuits supplied with said first and second responses respectively, said tube being normally biased to one conductive condition and actuable jointly by said responses to another conductive condition, an alarm circuit connected to the output circuit of said tube and responsive to said other conductive condition, check means actuable to expose said detector to a check source of radioactive material and produce a count rate of at least said predetermined level, means responsive to said first response for actuating said check means, whereby said second response is produced and the alarm control device actuated, timing means for periodically actuating said check means for corresponding checking periods and rendering ineffective the output circuit to said alarm, and means for indicating one of said conductive conditions of the alarm control tube during said checking periods.

11. A self-checking radioactivity monitor which comprises a radioactivity detector adapted to respond to at least two types of radioactivity, shielding means allowing said detector to respond to one of said types of radioactivity but substantially excluding said other type, an aperture in said shielding means allowing said detector to respond to said other type of radioactivity, a count-rate circuit connected to said detector and including a plurality of stages respectively responsive to successively higher approximately decade ranges of count rates, the outputs of said stages being approximately equal at the tops of their respective ranges and being combined additively to give a resultant output, an alarm level detector connected to said count-rate circuit and adapted to yield a first response when said resultant output exceeds a set alarm level, said alarm level being adjustable over a predetermined range, a check level detector connected to said count-rate circuit and adapted to yield a second response when said resultant output exceeds a predetermined checking level, said checking level being at least as high as to fall within the range of the highest decade stage in said predetermined alarm level range, an alarm control tube having a pair of input control circuits supplied with said first and second responses respectively, said tube being normally biased to one conductive condition and actuable jointly by said responses to another conductive condition, an alarm circuit connected to the output circuit of said tube and responsive to said other conductive condition, check means actuable to expose said detector to a check source of said other type of radioactivity through said aperture and produce a count rate of at least said predetermined level, means responsive to said first response for actuating said check means, whereby said second response is produced and the alarm control tube actuated, timing means for periodically actuating said check means for corresponding checking periods and rendering ineffective the output circuit to said alarm, and means for indicating one of said conductive conditions of the alarm control tube during said checking periods.

12. A self-checking radioactivity monitor which comprises a radioactivity detector and a count-rate circuit therefor, said detector being adapted to respond to at least two types of radioactivity, shielding means allowing said detector to respond to one of said types of radioactivity but substantially excluding said other type, an aperture in said shielding means having an area very small compared to the sensitive area of said detector and allowing said detector to respond to said other type of radioactivity, the response of the detector to the passage of said one type of radiation through said aperture being small compared to the response to the passage thereof through said shielding means, an alarm level detector connected to said count-rate circuit and adapted to yield a first response when the count rate exceeds a set alarm level, an alarm control circuit supplied with said first response, check means actuable to expose said detector to a check source of said other type of radioactivity through said aperture with said shielding means in shielding position, said check source being substantially free of said one type of radioactivity, and timing means for periodically actuating said check means for corresponding checking periods.

13. A radioactivity indicator which comprises a radioactivity detector adapted to respond to at least two types of radioactivity, shielding means allowing said detector to respond to one of said types of radioactivity but substantially excluding said other type, an aperture in said shielding means having an area very small compared to the sensitive area of said detector and allowing said detector to respond to said other type of radioactivity, the response of the detector to passage of said one type of radiation through said aperture being small compared to the response to the passage thereof through said shielding means, a check source of said other type of radioactivity and substantially free of said one type of radioactivity, and means for exposing said detector to said check source through said aperture with said shielding means in shielding position.

14. A self-checking radioactivity monitor which comprises a radioactivity detector, a count-rate circuit connected to said detector and including a plurality of stages respectively responsive to successively higher approximately decade ranges of count rates, the outputs of said stages being approximately equal at the tops of their respective ranges and being combined additively to give a resultant output, an alarm level detector connected to said count-rate circuit and adapted to yield a first response when said resultant output exceeds a set alarm level, said alarm level being adjustable over a predetermined range, a check level detector connected to said count-rate circuit and adapted to yield a second response when said resultant output exceeds a predetermined checking level, said checking level being at least as high as to fall within the range of the highest decade stage in said predetermined alarm level range, an alarm control tube having a pair of input control circuits supplied with said first and second responses respectively, said tube being normally biased to one conductive condition and actuable jointly by said responses to another conductive condition, an alarm circuit connected to the output circuit of said tube and responsive to said other conductive condition, check means actuable to expose said detector to a check source of radioactive material and produce a count rate of at least said predetermined level, means responsive to said first response for actuating said check means, whereby said second response is produced and the alarm control tube actuated, timing means for periodically actuating said check means for corresponding checking periods and rendering ineffective the output circuit to said alarm, and means for indicating one of said conductive conditions of the alarm control tube during said checking periods.

15. A self-checking radioactivity monitor which comprises a radioactivity detector and a count-rate circuit therefor, an alarm level detector connected to said count-rate circuit and adapted to yield a substantially D.-C. output voltage changing from a first value to a second value when the count rate exceeds a set alarm level, a check level detector connected to said count-rate circuit and adapted to yield an output pulse when the count rate exceeds a predetermined level, said predetermined level being normally at least as high as said alarm level, an alarm control switching circuit supplied with the outputs of said alarm and check level detectors respectively, said switching circuit having two conditions of operation and actuable from a first condition to a second condition only upon the arrival of a check level output pulse with the alarm level output voltage at said second value, an alarm circuit connected to the output of said switching circuit and responsive to said second condition of operation, check means actuable to expose said detector to a check source of radioactive material and produce a count-rate of at least said predetermined level, means responsive to said alarm level detector for actuating said check means when the output changes to said second value, whereby said check level output pulse is produced and the switching circuit actuated, timing means for periodically actuating said check means for corresponding checking periods, and means for indicating one of said conditions of operation of said switching circuit during said checking periods.

References Cited in the file of this patent

UNITED STATES PATENTS

| | | |
|---|---|---|
| 2,666,857 | McLaren et al. | Jan. 19, 1954 |
| 2,820,905 | Schloss | Jan. 21, 1958 |
| 2,839,688 | Anton | June 17, 1958 |
| 2,874,354 | Bell | Feb. 17, 1959 |